No. 692,445. Patented Feb. 4, 1902.
O. HOFFMANN.
GRASS CATCHER ATTACHMENT FOR LAWN MOWERS.
(Application filed May 20, 1901.)
(No Model.)
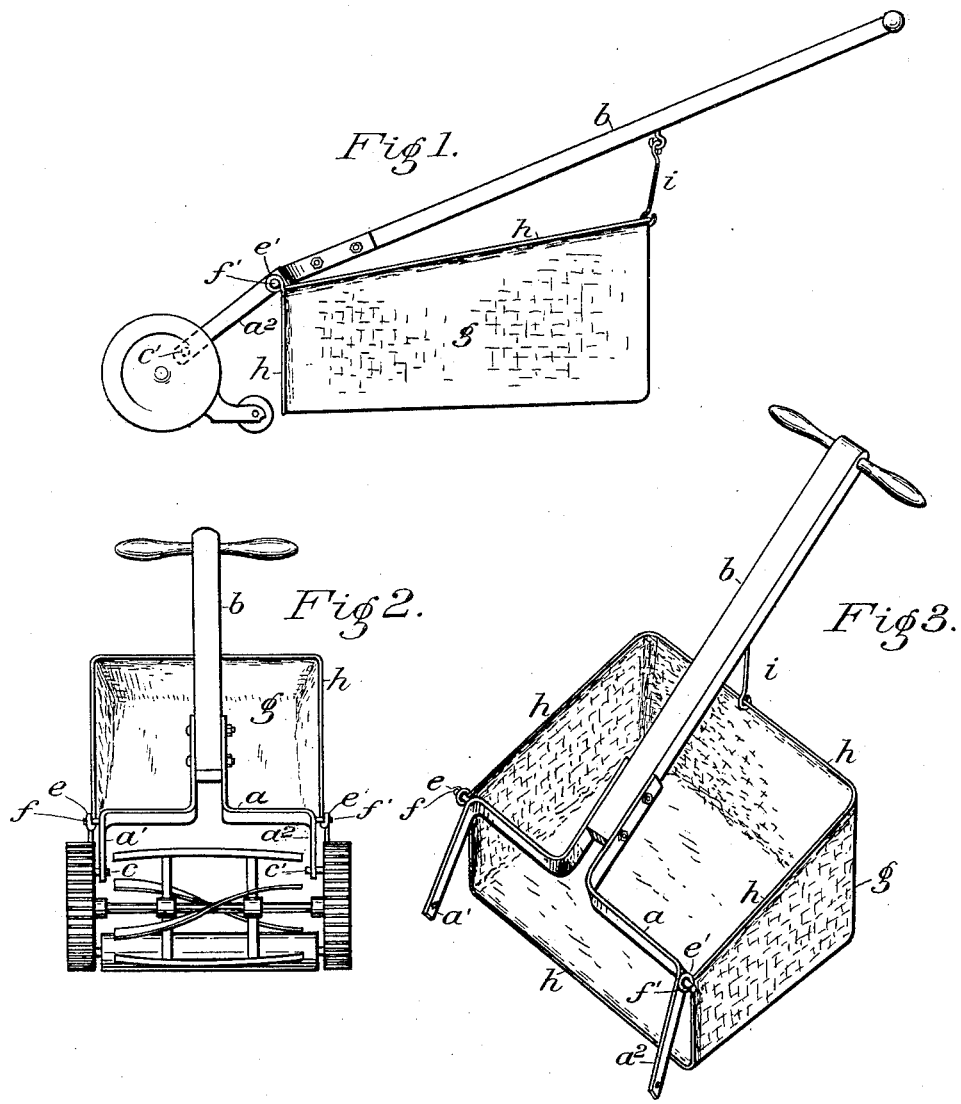
Witnesses:
F. W. Ayers
N. J. Neumann.
Inventor,
Otto Hoffmann
by F. J. Geisler
his attorney

UNITED STATES PATENT OFFICE.

OTTO HOFFMANN, OF PORTLAND, OREGON.

GRASS-CATCHER ATTACHMENT FOR LAWN-MOWERS.

SPECIFICATION forming part of Letters Patent No. 692,445, dated February 4, 1902.

Application filed May 20, 1901. Serial No. 61,184. (No model.)

*To all whom it may concern:*

Be it known that I, OTTO HOFFMANN, a citizen of the United States, and a resident of Portland, in the county of Multnomah and State of Oregon, have invented a new and useful Improvement in Grass-Catcher Attachments for Lawn-Mowers, of which the following is a specification, reference being had to the accompanying drawings as constituting a part thereof.

My invention relates to the receiver or receptacle attached to lawn-mowers for the purpose of catching the grass-clippings thrown off by the knives; and my invention has for its object to obtain a simple, inexpensive, and serviceable contrivance and to provide for removably suspending the same from the yoke of the handle-bar of the lawn-mower in such position as to be well adapted for the work it has to perform.

To this end my grass-catcher comprises a wire frame of suitable shape having ears formed at its mouth end, and the extremities of the yoke of the handle-bar are bent downward at an oblique angle and provided with laterally-projecting stud-pins, on which the mouth end of the catcher is removably suspended by its said ears. These features and the general construction and operation of my invention are illustrated in the drawings.

In such drawings, Figure 1 is a side elevation of a lawn-mower of common type provided with my improved grass-catcher attachment. Fig. 2 is a front elevation of a lawn-mower provided with my improved attachment, and Fig. 3 is a perspective view showing the handle-bar and the yoke whereby the same is attached to the machine and the trough in which to catch the cut grass.

The letters designate the parts referred to.

The yoke $a$, connecting the handle-bar $b$ with the machine, consists of two parts $a'$ $a^2$, bolted to the sides of the handle-bar. The lower end of the handle-bar does not come down to the horizontal portions of the yoke, so as to admit of the laterally-projecting arms or members of the yoke being sprung together at the ends for the purpose of inserting the perforated ends on the stud-pins $c$ $c'$, projecting laterally from the interior sides of the wheel-casings of the mower. From the sides of the two arms of the yoke project stud-pins $e$ $e'$, on which to insert the ears $ff'$ of the grass receiver or receptacle $g$. Such catcher consists of a frame $h$ made of wire of sufficient rigidity and shaped as shown in Fig. 3. Ears $ff'$ are formed at the front end of the frame, and to such frame is attached in any convenient manner a bag made of canvas, substantially of rectangular form, and enlarging so as to be deepest at the farther end. A hook $i$ is attached to the frame, and in the handle-bar is affixed a screw-eye, in which the head of the hook may be inserted. To remove and reattach again the catcher, the ears $ff'$ are sprung apart, so as to disengage the same from the stud-pins $e$ $e'$. It will be observed that the extremities of the members $a'$ $a^2$ of the yoke are bent down at an oblique angle. The object of this arrangement is to support the grass-catcher in a position suitable to its work. It also enables the grass-catcher to be made of ample depth, and the open front thereof is by such provision so positioned as to catch the grass-clippings as thrown off by the rotating knives. As heretofore arranged the mower threw a considerable portion of the grass-clippings over the catcher, and the lawn had frequently to be raked and swept to remove such clippings, which consumed considerable time.

A convenient way of obtaining the ears $e$ $e'$ on the front end of the frame is shown in the drawings and consists in crossing two sections of the wire frame to form loops.

Besides the convenience afforded by the arrangement of the stud-pins on the yoke of the handle and the ears formed on the frame such arrangement holds the grass-catcher steady against swinging sidewise, which rocking of the catcher while using the mower frequently causes considerable annoyance.

Having fully described my invention, what I claim, and desire to secure by Letters Patent, is—

1. The combination, in a lawn-mower, of the handle-bar and the yoke thereof having downwardly-bent extremities pivotally connected with the mower, stud-pins laterally projecting from the yoke, and a grass-catcher comprising a wire frame and fabric body; ears, or perforated portions, at the upper front end of the frame removably inserted on said stud-pins; and means for suspending the rear end of the catcher, substantially as described.

2. The combination, in a lawn-mower, of the handle-bar and the yoke thereof having downwardly-bent extremities, pivotally connected to the mower; stud-pins laterally projecting from the yoke, and the grass-catcher comprising a wire frame and fabric body, the portions at the upper front end of the frame being formed into loops, or ears, removably inserted on said stud-pins; and means for suspending the rear end of the catcher, substantially as described.

In testimony whereof I have hereunto affixed my signature, in the presence of two witnesses, this 3d day of April, 1901.

OTTO HOFFMANN.

Witnesses:
T. J. GEISLER,
E. M. HOWATWON.